US011107265B2

(12) United States Patent
Tang et al.

(10) Patent No.: US 11,107,265 B2
(45) Date of Patent: Aug. 31, 2021

(54) HOLOGRAPHIC PALM RAYCASTING FOR TARGETING VIRTUAL OBJECTS

(71) Applicant: Microsoft Technology Licensing, LLC, Redmond, WA (US)

(72) Inventors: Sheng Kai Tang, Redmond, WA (US); Julia Schwarz, Redmond, WA (US); Jason Michael Ray, Seattle, WA (US); Sophie Stellmach, Kirkland, WA (US); Thomas Matthew Gable, Seattle, WA (US); Casey Leon Meekhof, Redmond, WA (US); Nahil Tawfik Sharkasi, Woodinville, WA (US); Nicholas Ferianc Kamuda, Seattle, WA (US); Ramiro S. Torres, Seattle, WA (US); Kevin John Appel, Seattle, WA (US); Jamie Bryant Kirschenbaum, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 3 days.

(21) Appl. No.: 16/299,052

(22) Filed: Mar. 11, 2019

(65) Prior Publication Data

US 2020/0226814 A1 Jul. 16, 2020

Related U.S. Application Data

(60) Provisional application No. 62/791,605, filed on Jan. 11, 2019.

(51) Int. Cl.
*G06F 3/0482* (2013.01)
*G06T 15/06* (2011.01)
(Continued)

(52) U.S. Cl.
CPC ............ *G06T 15/06* (2013.01); *G02B 27/017* (2013.01); *G06F 3/017* (2013.01); *G06T 7/521* (2017.01); *G06T 19/003* (2013.01)

(58) Field of Classification Search
CPC .................................. G06F 3/011; G06F 3/017
See application file for complete search history.

(56) References Cited

U.S. PATENT DOCUMENTS

| 2009/0172606 A1* | 7/2009 | Dunn ...................... G06F 3/038 715/863 |
| 2011/0141009 A1* | 6/2011 | Izumi ...................... A63F 13/04 345/156 |

(Continued)

OTHER PUBLICATIONS

"International Search Report and Written Opinion Issued in PCT Application No. PCT/US19/067706", dated Mar. 11, 2020, 14 Pages.

*Primary Examiner* — Rayeez R Chowdhury
(74) *Attorney, Agent, or Firm* — Alleman Hall Creasman & Tuttle LLP

(57) ABSTRACT

A head-mounted display comprises a display device and an outward-facing depth camera. A storage machine comprises instructions executable by a logic machine to present one or more virtual objects on the display device, to receive information from the depth camera about an environment, and to determine a position of the head-mounted display within the environment. Based on the position of the head-mounted display, a position of a joint of a user's arm is inferred. Based on the information received from the depth camera, a position of a user's hand is determined. A ray is cast from a portion of the user's hand based on the position of the joint of the user's arm and the position of the user's hand. Responsive to the ray intersecting with one or more control points of a virtual object, the user is provided with an indication that the virtual object is being targeted.

20 Claims, 7 Drawing Sheets

(51) Int. Cl.
*G06F 3/01* (2006.01)
*G02B 27/01* (2006.01)
*G06T 7/521* (2017.01)
*G06T 19/00* (2011.01)

(56) References Cited

U.S. PATENT DOCUMENTS

| | | |
|---|---|---|
| 2012/0113223 A1 | 5/2012 | Hilliges et al. |
| 2012/0157203 A1 | 6/2012 | Latta et al. |
| 2013/0321265 A1* | 12/2013 | Bychkov .................. G06F 3/011 345/156 |
| 2013/0342671 A1* | 12/2013 | Hummel .................. G06F 3/011 348/77 |
| 2014/0282274 A1* | 9/2014 | Everitt .................... G06F 3/017 715/863 |
| 2016/0170603 A1* | 6/2016 | Bastien ................... G06F 3/005 348/49 |
| 2018/0046245 A1 | 2/2018 | Schwarz et al. |
| 2019/0258318 A1* | 8/2019 | Qin ..................... G06F 3/04842 |

* cited by examiner

HOLOGRAPHIC PALM RAYCASTING FOR TARGETING VIRTUAL OBJECTS

CROSS REFERENCE TO RELATED APPLICATIONS

This application claims priority to U.S. Provisional Patent Application Ser. No. 62/791,605, filed Jan. 11, 2019, the entirety of which is hereby incorporated herein by reference for all purposes.

BACKGROUND

Immersive technologies, such as virtual reality (VR), augmented reality (AR), and mixed reality (MR), enable users to view and perceive computer-generated three-dimensional objects, as if the objects were actually present within the users' perceived environments. Various interaction methodologies, including controller-based interaction methodology, natural interaction methodology, and hyper-natural interaction methodology, have each been developed to facilitate a user's virtual interactions with computer-generated three-dimensional objects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display comprises a display device and an outward-facing depth camera. A storage machine comprises instructions executable by a logic machine to present one or more virtual objects on the display device, to receive information from the depth camera about an environment, and to determine a position of the head-mounted display within the environment. Based on the position of the head-mounted display, a position of a joint of a user's arm is inferred. Based on the information received from the depth camera, a position of a user's hand is determined. A ray is cast from a portion of the user's hand based on the position of the joint of the user's arm and the position of the user's hand. Responsive to the ray intersecting with one or more control points of a virtual object, the user is provided with an indication that the virtual object is being targeted.

DETAILED DESCRIPTION

A natural interaction with 3D objects in a virtual, augmented, or mixed reality application has the advantage of being familiar to users because it corresponds to how they interact with objects in the real world. However, interacting with 3D objects presented to be out of arms' reach can be difficult. At a distance, hyper-natural or "magic" interaction methodologies may be better suited than a natural interaction methodology.

Further, while near interactions occur via direct manipulation of holograms and affordances using the hands, users must also be able to interact with holograms presented at a distance from the user. This interaction should ideally be integrated with or connected to the direct interaction experience in some way and should have clear affordances regarding the currently aimed direction and selection status.

Ray-casting, by way of example, is a feature typically employed by various hyper-natural interaction methodologies for interacting with distant objects. With ray-casting, a virtual light ray of sorts, projected from a user's hand or head for example, can enable the user to interact with objects that are far away or presented as being out of arms' reach. However, interacting with objects using ray-casting presents its own challenges.

This detailed description includes scenarios wherein a ray or beam emanates from a portion of the users' hand (e.g., palm) when the user aims their open hand in front of themselves. As an example, the ray may be visualized via a dashed line when the hands are open, with a cursor, such as a ring cursor, displayed when the ray is targeted at a virtual display object. The user may make a selection gesture, such as an air-tap, to select an item that they are currently targeting. In doing so, the appearance of the ray may change. For example, the ray itself may be presented as a solid line while the cursor changes from a ring into a dot. This cursor change can be either binary or analog, e.g., the ring can continuously close as the fingers come together to form an air-tap. Once an object is selected, the user may manipulate the object with the same manipulation gestures utilized for direct manipulation of proximal objects. The ray may be cast in such a way that users can target with their hands at their sides or out in front of them by modeling a position of a shoulder and/or elbow of the user, and then casting the ray through the user's modeled arm joint and their hand-tracked palm joint via hand-tracking technology.

Figure 1:
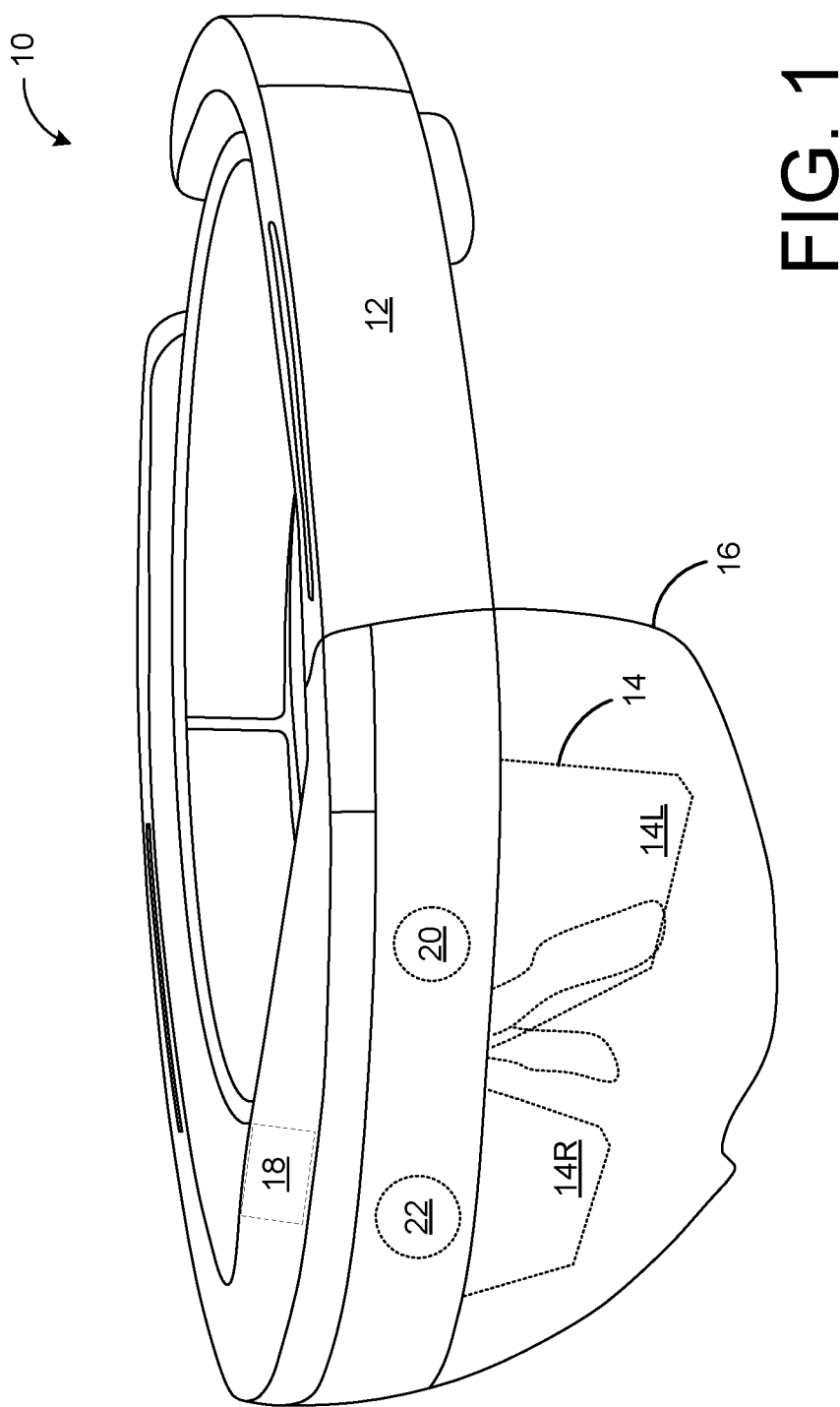
FIG. 1 shows a schematic view of a head-mounted display device according to an example of the present disclosure.

FIG. 1 schematically illustrates an example head-mounted display device 10. The head-mounted display device 10 includes a frame 12 in the form of a band wearable around a head of the user that supports see-through display componentry positioned near the user's eyes. Head-mounted display device 10 may use augmented reality technologies to enable simultaneous viewing of virtual display imagery and a real-world background. As such, the head-mounted display device 10 may generate virtual images via see-through display 14, which includes separate right and left eye displays 14R and 14L, and which may be wholly or partially transparent. The see-through display 14 may take any suitable form, such as a waveguide or prism configured to receive a generated image and direct the image towards a wearer's eye. The see-through display 14 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 14 may utilize quantum-dot display technologies, active-matrix organic LED (OLED) technology, and/or any other suitable display technologies. It will be understood that while shown in FIG. 1 as a flat display surface with left and right eye displays, the see-through display 14 may be a single display, may be curved, or may take any other suitable form.

The head-mounted display device 10 further includes an additional see-through optical component 16, shown in FIG. 1 in the form of a see-through veil positioned between the see-through display 14 and the real-world environment as viewed by a wearer. A controller 18 is operatively coupled to the see-through optical component 16 and to other display componentry. The controller 18 includes one or more logic devices and one or more computer memory devices storing instructions executable by the logic device(s) to enact functionalities of the head-mounted display device 10. The head-mounted display device 10 may further include various other components, for example a two-dimensional image camera 20 (e.g. a visible light camera and/or infrared camera) and a depth imaging device 22, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Depth imaging device 22 may include an infrared light-based depth camera (also referred to as an infrared light camera) configured to acquire video of a scene including one or more human subjects. The video may include a time-resolved sequence of images of spatial resolution and frame rate suitable for the purposes set forth herein. The depth imaging device and/or a cooperating computing system (e.g., controller 18) may be configured to process the acquired video to identify one or more objects within the operating environment, one or more postures and/or gestures of the user wearing head-mounted display device 10, one or more postures and/or gestures of other users within the operating environment, etc.

The nature and number of cameras may differ in various depth imaging devices consistent with the scope of this disclosure. In general, one or more cameras may be configured to provide video from which a time-resolved sequence of three-dimensional depth maps is obtained via downstream processing. As used herein, the term "depth map" refers to an array of pixels registered to corresponding regions of an imaged scene, with a depth value of each pixel indicating the distance between the camera and the surface imaged by that pixel.

In some implementations, depth imaging device 22 may include right and left stereoscopic cameras. Time-resolved images from both cameras may be registered to each other and combined to yield depth-resolved video.

In some implementations, a "structured light" depth camera may be configured to project a structured infrared illumination having numerous, discrete features (e.g., lines or dots). A camera may be configured to image the structured illumination reflected from the scene. Based on the spacings between adjacent features in the various regions of the imaged scene, a depth map of the scene may be constructed.

In some implementations, a "time-of-flight" (TOF) depth camera may include a light source configured to project a pulsed infrared illumination onto a scene. Two cameras may be configured to detect the pulsed illumination reflected from the scene. The cameras may include an electronic shutter synchronized to the pulsed illumination, but the integration times for the cameras may differ, such that a pixel-resolved time-of-flight of the pulsed illumination, from the light source to the scene and then to the cameras, is discernible from the relative amounts of light received in corresponding pixels of the two cameras.

Augmented reality features may be based on articulated hand interactions. For proximal objects, direct interactions may be utilized, whereby hands can be perceived as directly manipulating holograms. In some examples, the holograms will be distal to the user (e.g., above a threshold based on arm length). A distance may be calculated between the user, or an extension of the user, and the intended target. In this way, a comparison of the relative distance can be made against a threshold distance, such as an average reach distance (e.g., 0.7 meters) of an arm, to determine whether the intended target is deemed "near" (e.g., within reach) or "far" (e.g., out of reach) relative to the user. Magic or hyper-natural capabilities may thus be generated for the user so they may interact with distal holograms without "walking towards" the holograms.

Figure 2:
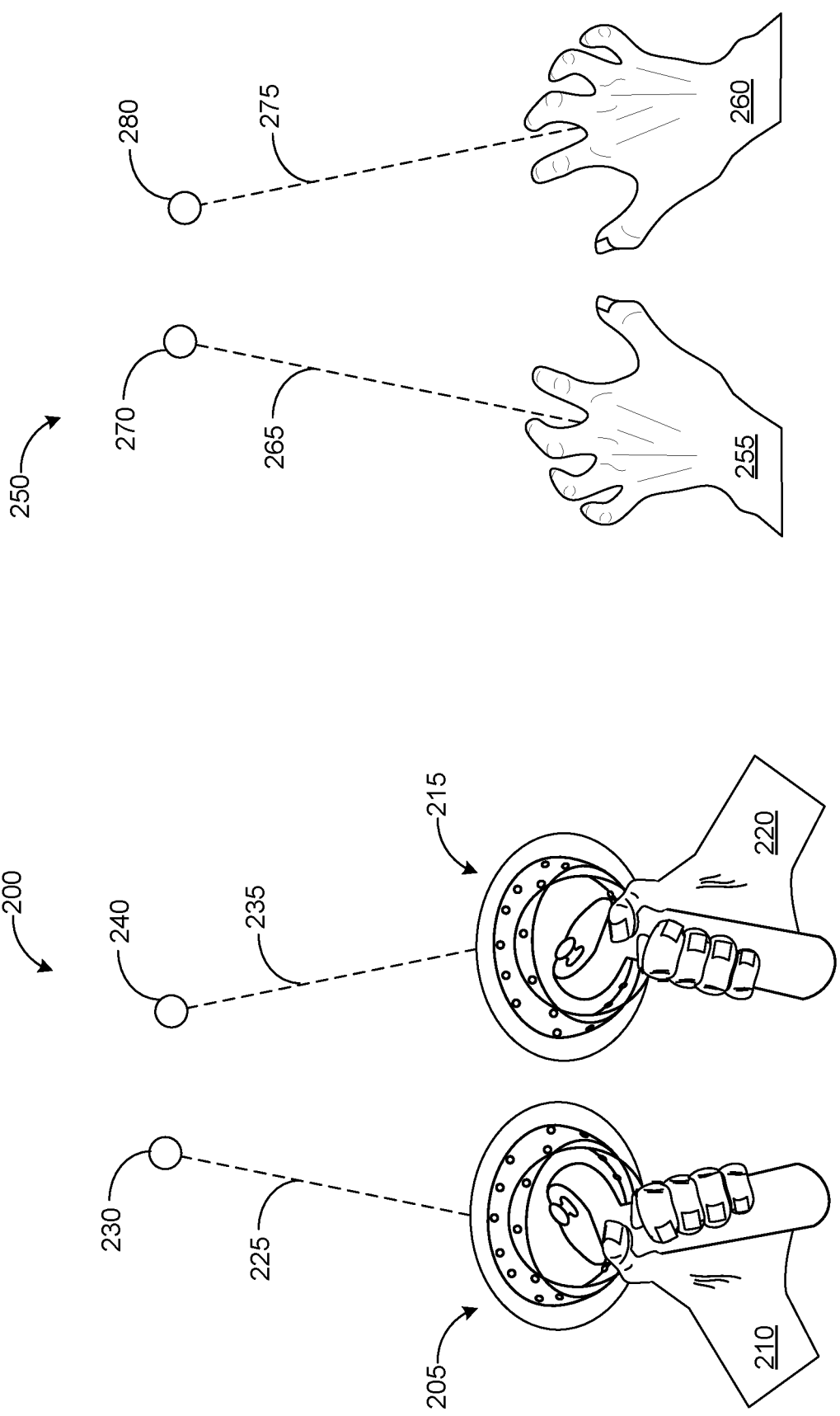
FIG. 2 shows an illustration of ray-casting performed by via a controller and via a user's hands.

Many VR devices include a Six-Degrees-of-Freedom (6DoF) controller that shoots out a ray from the controller, allowing for targeting, selection, and manipulation of virtual objects. An example is shown at 200 of FIG. 2. A user holds a first 6DoF controller 205 in the user's left hand 210, and holds a second 6DoF controller 215 in the user's right hand 220. The user may operate first controller 205 to generate a first ray 225, depicted as a dashed line terminating in a selection cursor 230, and may operate second controller 215 to generate a second ray 235, depicted as a dashed line terminating in a selection cursor 240. The user may manipulate first controller 205 and second controller 215 to target the generated rays, to aim the selection cursors at virtual objects, and to select and manipulate virtual objects via the various buttons, controls, etc. included in the controllers.

However, many VR, AR, and MR applications are moving away from the use of tangible controllers and moving towards operating systems that predominantly rely on gesture-based controls. For these applications, while only a user's hands are available, the system may want to leverage the same mental model and user experience into an intuitive set of interface controls.

Such an example of hand-based ray-casting is shown at 250. A user's left hand 255 and right hand 260 are depicted in an open conformation. A first ray 265 is displayed as originating from the palm of the user's left hand 255, depicted as a dashed line terminating in a selection cursor 270. A second ray 275 is displayed as originating from the palm of the user's right hand 260, depicted as a dashed line terminating in a selection cursor 280. Ray-casting in this way provides numerous advantages over previous models, such as methods where gazecasting is used to point at objects, and then the user's hands are utilized to control actions. Casting directly from the hand may allow for more intuitive targeting and fine control. By using the palm, the user also retains the mental and physical freedom to manipulating targeted objects with their fingers.

Figure 3:
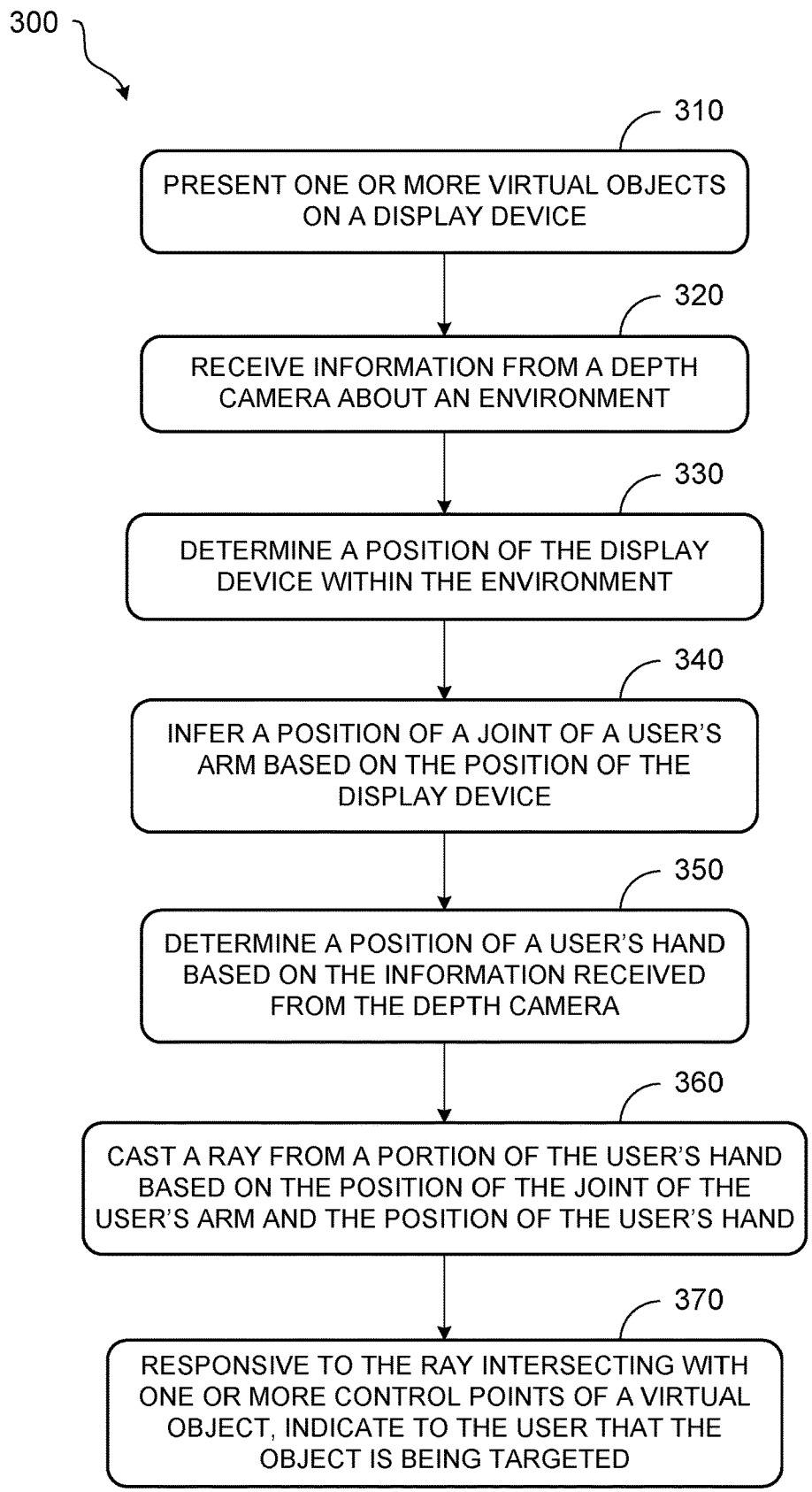
FIG. 3 shows an example method for ray-casting in an augmented reality environment.

FIG. 3 shows an example method 300 for ray-casting in an augmented reality environment. At 310, method 300 includes presenting one or more virtual objects on a display device, such as a head-mounted display. One or more virtual objects may be rendered in an immersive environment, and may be transformed by a virtual object rendering machine to modify the position, size, shape, or angle, of the rendered virtual object(s) in accordance with the position and orientation of the head mounted display. Each rendered virtual object may be presented at a corresponding location in an environment relative to the display device, and thereby also to the user wearing the display device as part of a head-mounted display. Moreover, the rendered virtual object(s) may be continuously modified in real-time, to maintain the proper perspective and configuration of rendered virtual objects in accordance with the changing position and orientation of the head-mounted display. In this regard, if a user moves closer to a rendered virtual object, its relative distance will appear closer to the user. Similarly, if the user moves away from the rendered virtual object, its relative distance will appear further from the user.

As described further herein, received input data may be processed in order to transform an intended target identified from the rendered virtual objects. That is, various applications (e.g., immersive technology software) may include instructions or code that facilitate user interaction with one or more rendered virtual objects, facilitated by one of a plurality of interaction methodologies. When an intended target is identified, a user may be able to move (e.g., reposition), transform (e.g., scale, rotate, skew, stretch, warp, etc.), manipulate, or delete rendered objects, or even create new ones, utilizing a selected interaction methodology.

At 320, method 300 includes receiving information from the depth camera about an environment. For example, information received from the depth camera may be used to determine the position and size of environmental boundaries, such as walls, ceilings, floors, windows, doors, etc. as well as the position, size, and orientation of real-world objects within the environment.

At 330, method 300 includes determine a position of the display device within the environment. The position of the display device may be based on the information received from the depth camera. The position of the display device, when included in a head-mounted display may further be based on information received by one or more additional sensor components, such as orientation sensors (e.g., gyroscope, accelerometer, and magnetometer) and/or positional sensors (e.g., infrared lights, infrared cameras, motion sensors, light sensors, 3D scanners, CMOS sensors, GPS radio, etc.) that can facilitate the generation of tracking data corresponding to the orientation and position of the head-mounted display, as well as corresponding to the field of view perceived by the user of the head-mounted display.

At 340, method 300 includes inferring a position of a joint of a user's arm based on the position of the head-mounted display. The joint of the user's arm may be a shoulder, an elbow, or wrist, for example. In some examples, the joint of the user's arm may not be visible to the depth camera of the head-mounted display, and thus the 3D position of the joint may be inferred. For example, ergonomics-based metrics may be used to predict the position of the user's shoulder and/or elbow based on a known head location. A code modeled shoulder and/or elbow of the user may be determined. In some examples, the user may perform calibration exercises to determine the range of possible positions for the user's shoulders and elbows based on the 6DoF position of the head-mounted display. Additional information, such as the position of the user's hand may further inform the position of the user's shoulder or elbow. Alternatively, the absence of the user's hand from the FOV of the head-mounted display's depth camera may narrow the possible positions for the user's shoulder or elbow. In some examples, if an external camera is available, this calculation may not be needed.

At 350, method 300 includes determining a position of a user's hand based on the information received from the depth camera. In some embodiments, the head-mounted display may be configured to analyze the pixels of a depth map that correspond to the user, in order to determine what part of the user's body each pixel corresponds to. In one example, each pixel of the depth map with an appropriate person index may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses; trainers provide ground truth annotations labeling various machine-learning classifiers in the observed data. The observed data and annotations are then used to generate one or more machine-learned algorithms that map inputs to desired outputs. Thereafter, a virtual skeleton is fit to the pixels of depth video that correspond to the user.

Point clouds (e.g., portions of a depth map) corresponding to the user's hands may be further processed to reveal the skeletal substructure of the hands, and to identify components of the user's hands, such as wrist joints, finger joints, adjoining finger segments, knuckles, palm, dorsum, etc. By analyzing positional change in the various hand joints and/or segments, the corresponding poses, movements, gestures or actions of the imaged hand may be determined.

At 360, method 300 includes casting a ray from a portion of the user's hand based on the position of the joint of the user's arm and the position of the user's hand. For example, the head-mounted display may generate and/or receive the 3D coordinates of the joint of the user's arm and the 3D coordinates of the hand of the user. The head-mounted display is configured, in effect, to extend a ray with an endpoint at the location of the joint of the user's arm and passing through the portion of the user's hand. For example, lines may be generated for the shoulder, and/or elbow, as well as for the palm, wrist, knuckle, etc. A ray may then be cast based on these locations and orientations. In some examples, a calibration of the user's arm length may simplify this algorithm. In some examples, the user's natural corrections may augment and inform the calibration.

The length of the cast ray may be finite or may be infinite. For rays of finite length, the distal terminus of the ray may be indicated in the form of a cursor, icon, or other suitable display object. This cursor may be used to target a virtual object. The length of a finite ray may be based on user preferences, the dimensions of the environment, the positioning of virtual objects within the environment, etc. The user may be able to make a ray longer or shorter with a predetermined gesture. Additionally or alternatively, the ray may increase or decrease in length as the ray approaches virtual objects.

Figure 4B:
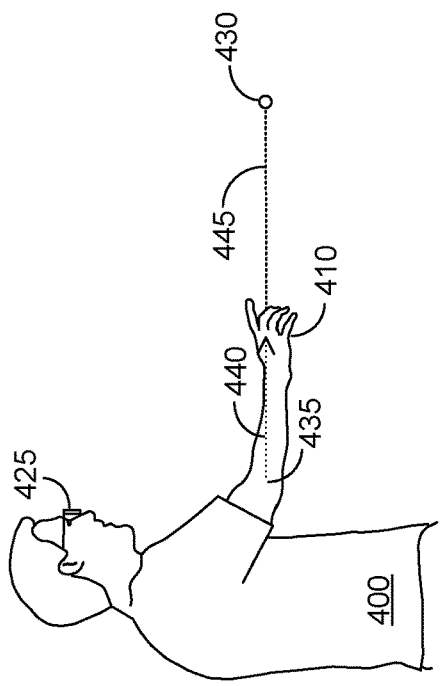
FIGS. 4A-4D show illustrations of various modes of ray-casting.
Figure 4D:
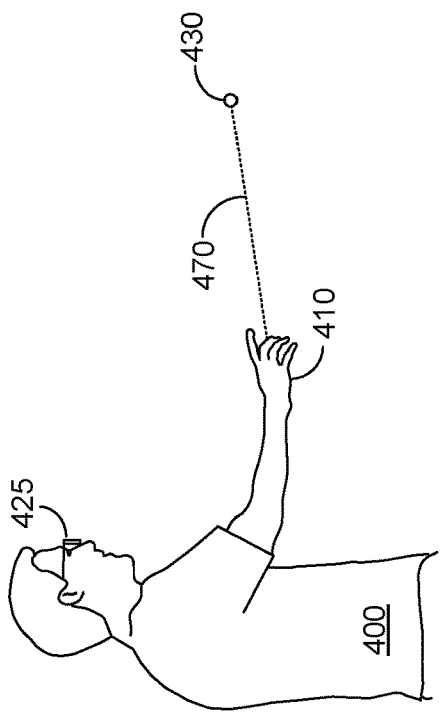
Figure 4A:
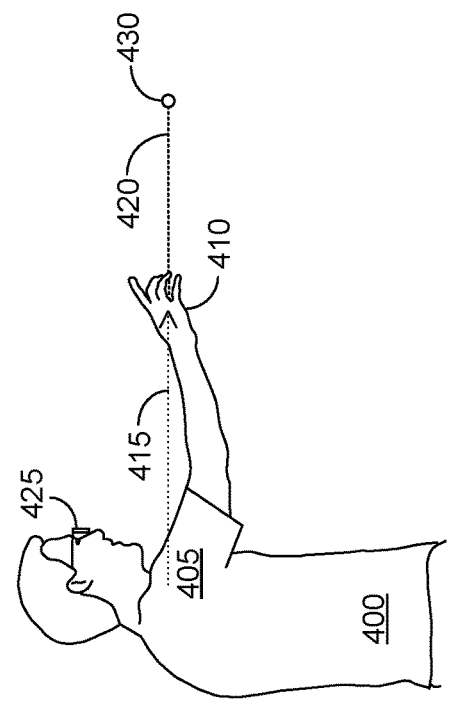

FIGS. 4A-4D show illustrations of various modes of ray-casting. FIG. 4A illustrates a user 400 casting a ray based on the position of the user's shoulder 405 and the user's palm 410. An initial ray 415 is positioned with an origin at the user's shoulder 405 passing through the user's palm 410. A targeting ray 420 is displayed to the user on head-mounted display 425 extending from the user's palm 410 into the environment, with a terminus at cursor 430. In this example, targeting ray 420 is depicted as being a linear extension of initial ray 415. However, in some examples, initial ray 415 may establish a range of directions for targeting ray 420. For example, targeting ray 420 may initially be displayed as an extension of initial ray 415. User 400 may then rotate their hand and or adjust the orientation of palm 410 to adjust ray position. This may allow the user to intuitively fine-tune the direction of targeting ray 420 within a range of targeting angles. Still further, in this and other examples, given an initial ray, the initially-determined targeting ray may be at a different angle than the initial ray. For example, when the ray extends between the user's shoulder and palm, it may be determined (e.g., from advance empirical testing) that a desirable angle for the targeting ray is slightly shallower, for example, than if the targeting ray were to extend at the same angle.

FIG. 4B illustrates user 400 casting a ray based on the position of the user's elbow 435 and the user's palm 410. An initial ray 440 is positioned with an origin at the user's elbow 435 passing through the user's palm 410. A targeting ray 445 is displayed to the user on head-mounted display 425 extending from the user's palm 410 into the environment, with a terminus at cursor 430. As described with regard to FIG. 4A, the orientation of targeting ray 445 may be based on initial ray 440 and/or may be a linear extension of initial ray 440.

Figure 4C:
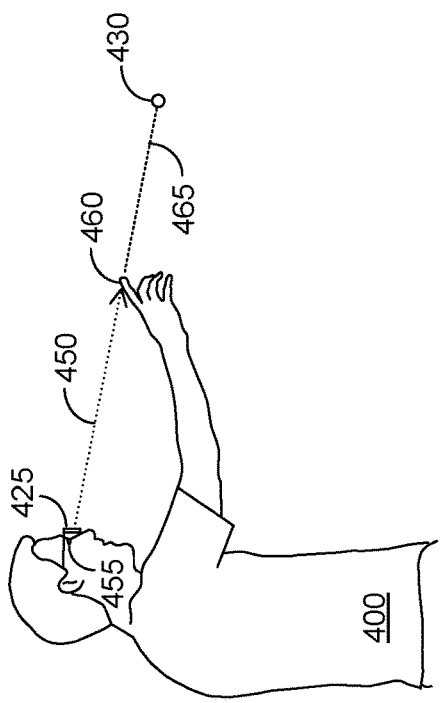

Additionally or alternatively, rays may be cast from a user's fingertips. Such an example is illustrated in FIG. 4C, using eye-to-finger casting, though elbow-to-finger may also be used. An initial ray 450 is positioned with an origin at the user's eye 455 passing through the user's finger 460. A targeting ray 465 is displayed to the user on head-mounted display 425 extending from the user's finger 460 into the environment, with a terminus at cursor 430. In this way, the user can point at virtual object and ray-cast to the virtual object.

In some examples, the ray may be cast based on palm orientation alone, as shown in FIG. 4D. A targeting ray 470 is displayed to the user on head-mounted display 425 extending from the user's palm 410 into the environment, with a terminus at cursor 430.

However, since hand tracking quality is still being improved, when hand orientation is mapped to ray orientations the aim/selection may be unstable. Anchor points at shoulder/elbow may thus be preferred in order to provide more stable and accurate targeting. However, anchor points may limit the available degrees of freedom.

Mechanisms may be included to hide the ray when the hand is in a suboptimal position. For example, pointing the palm up may be a gesture designated to signify another function. Pointing down, making a fist or closed grip may also signal the user's intent not to cast the ray. This may enable the system to match the user's intent as to when they want to use the functionality and to cast a ray. Other intentional gestures may be provided to the user for turning raycasting on or off. Semantic gestures such as finger pointing, or a "spiderman-style web-cast" gesture may also be used.

At 370, method 300 includes, responsive to the ray intersecting with one or more control points of a virtual object, indicating to the user that the object is being targeted. For example, various virtual objects may be presented on the head-mounted display. The coordinates of each object on the display may be stored with associated position data (e.g., X, Y, Z coordinates) Each virtual object may be further associated with registration data that may include coordinates defining the physical size, position, and orientation of the virtual object. The position data and registration data may then be compared to the registration data for a selection cursor positioned at the terminus of a cast ray.

For targeting, the user's shoulder or elbow pivot point may be used to direct the ray. The ray may be cast based at least in part on dynamic positioning and not just a fixed location. For example, if the user is targeting something closer to the center of their head, the ray angle may be adjusted to allow more precise control for targeting. As the user's hand moves back to periphery, the ray angle is scaled back up to a slightly lower resolution. This separation may enhance the user's targeting ability for centrally located objects.

A virtual object may be targeted when a cursor at the terminus of a cast ray is coincident with one or control points of the virtual object. In some examples, each control point may be associated with specific functions. Additionally or alternatively, each virtual object may present multi-functional control points. The ray-object collision point may display and/or enable the closest control point, a subset of control points, or all control points. In some examples, visual affordances, such as a tab, icon, etc., may be displayed that correspond with accessible control points on a targetable virtual object. In other examples, any point on the surface of a virtual object may be considered a control point (e.g., affordanceless). In some examples, any point on a bounding box for a virtual object may be considered a control point.

Figure 5B:
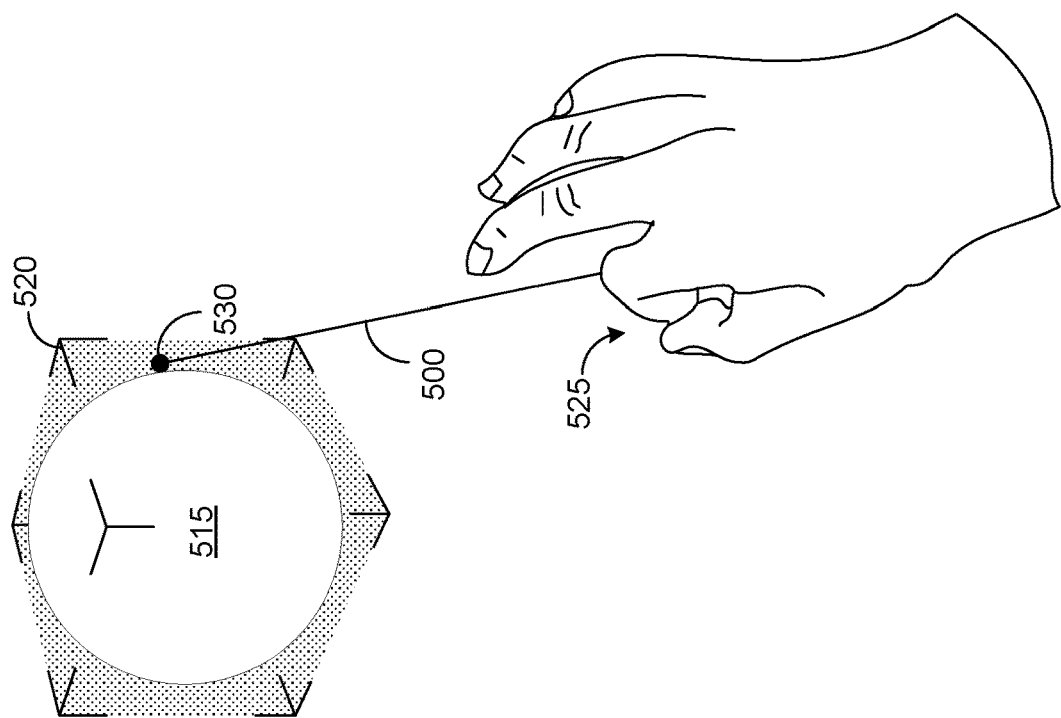
FIGS. 5A and 5B shows illustrations of visual feedback presented to a user making a selection gesture command.
Figure 5A:
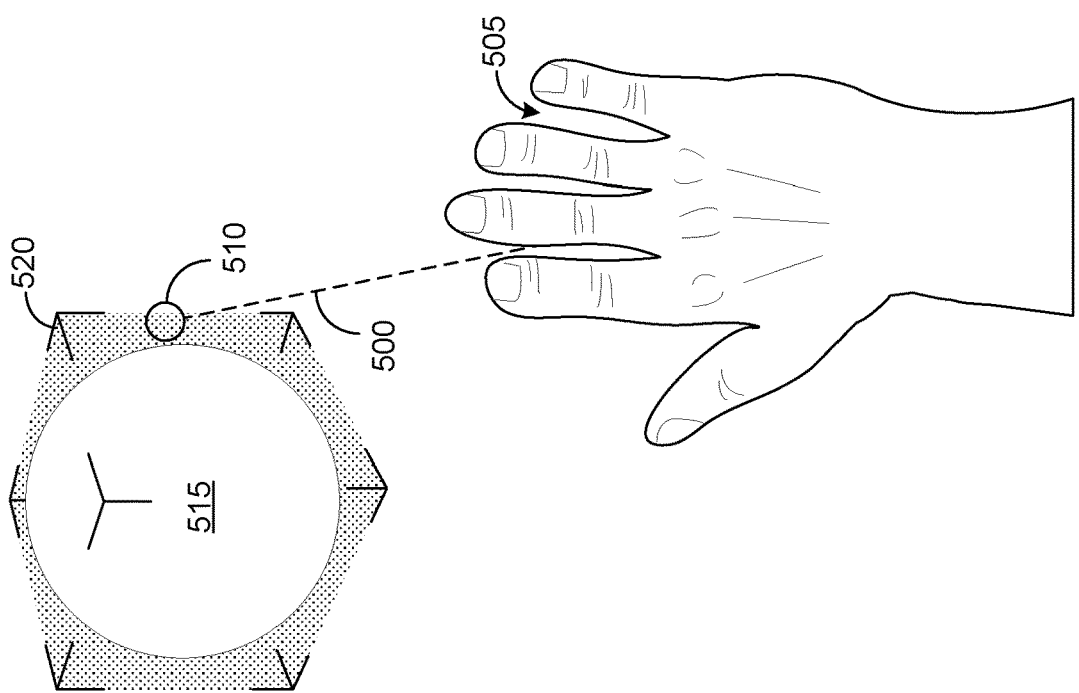

As an example, FIG. 5A shows an illustration of a user casting a ray 500 from the user's palm 505. Targeting cursor 510 is displayed at the terminus of ray 500. A virtual object (virtual ball 515) is shown within bounding box 520. Virtual ball 515 is selected based on the intersection of selection cursor 510 with bounding box 520.

Targeting of a virtual object may be indicated visually, such as by altering the appearance of the display object and/or control points, aurally, or by other suitable means. In some examples, a targeting cursor may be presented at a terminus of the ray opposite the user's hand. In some examples, the targeting ray will not be presented with a cursor until an object is targeted. In other examples, the targeting cursor may replace an initial cursor. The targeting cursor may have a different shape, size, or visual appearance (e.g., different color, blinking) from the initial cursor, or may otherwise indicate that the user has now targeted a virtual object.

In some examples, once a virtual object is targeted, the head-mounted display may recognize a selection gesture from the user's hand based on information received from the depth camera, and select the targeted object responsive to recognizing the selection gesture. For example, the cast ray may identify an object (or portions of an object or manipulation points, etc) in a fashion akin to hovering a mouse cursor. The user may then perform a finger-based gesture, such as a two-finger pinch to select the object.

Visual feedback may be provided to the user in order to enhance targeting and manipulation. For example, the appearance of the targeting cursor may be adjusted responsive to recognizing a selection gesture from the user's hand.

As an example, when the ray is cast, a cursor may be presented in the form of a small ring, as shown at 510 of FIG. 5A. When selection is done (e.g., the user pinches their index and thumb together, as shown at 525 of FIG. 5B) the cursor is animated to match the finger actions (e.g., resize to dot) as shown at 530 of FIG. 5B. The animation may be binary, progressive, or any other suitable means. Object selection may then cause the cursor to disappear or be presented in an alternative form. In this example, the appearance of cast ray 500 is also adjusted, from a dashed line during targeting in FIG. 5A to a solid line following selection in FIG. 5B.

Once targeted, a virtual object may be subject to manipulation by the user. For example, the head-mounted display may recognize a manipulation gesture from fingers of the user's hand based on information received from the depth camera, and manipulate the selected object responsive to recognizing the manipulation gestures.

Figure 6:
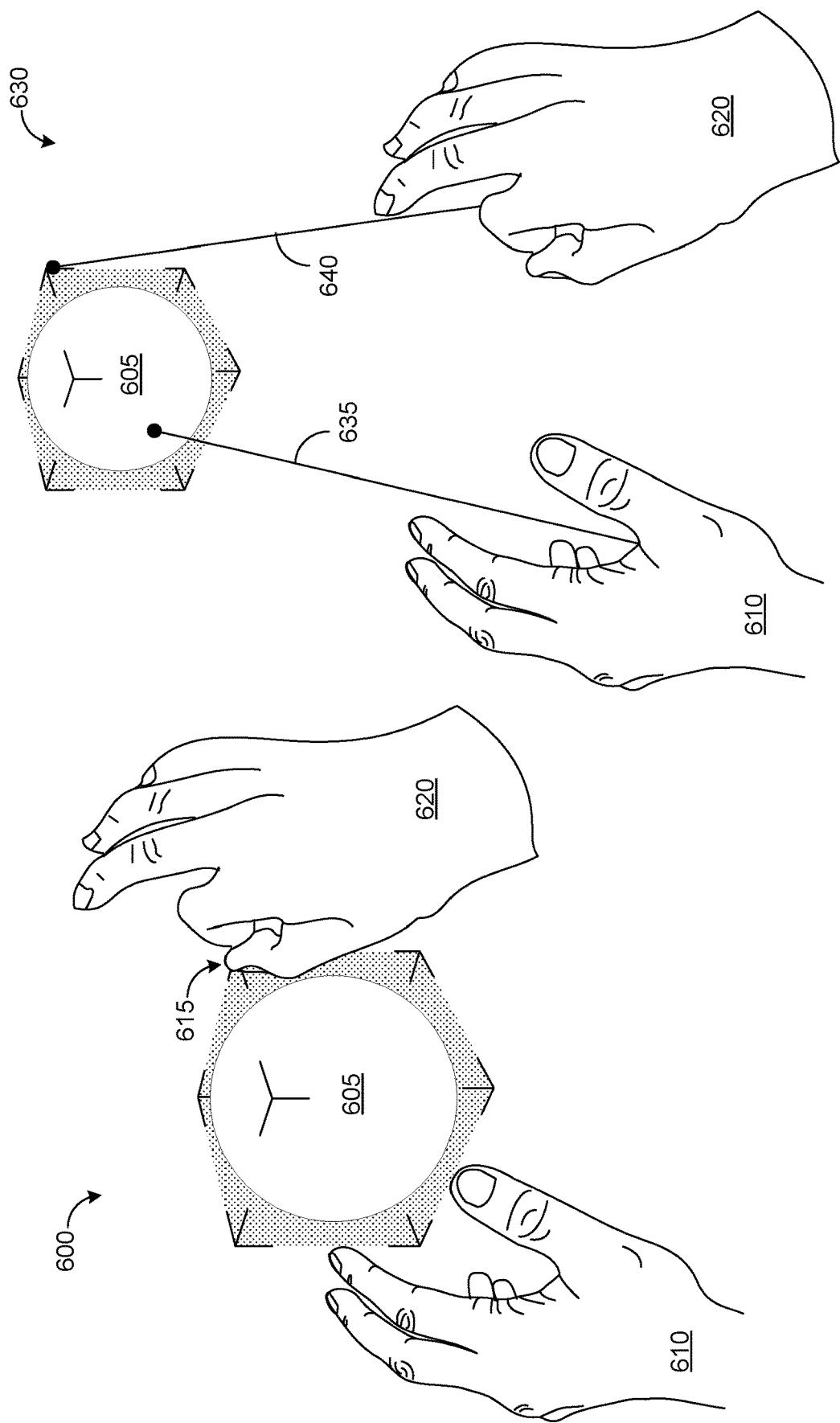
FIG. 6 shows an illustration of a user manipulating a virtual object at near and far distances.

If a user is manipulating a proximal object, they do so with a predetermined set of actions and gestures. For example, at 600 of FIG. 6, a user is shown grasping virtual ball 605 with a left hand 610 and pinching a control point 615 of virtual ball with a right hand 620. For example, a pinch gesture may be used to scale an object, grasping may enable moving an object, etc. Aiming at the outside of a bounding box may reposition the whole object. Aiming at a corner of the bounding box may rescale the object using single-hand manipulation. Smaller control points may respond to a pinch gesture, larger control points may respond to being grasped.

Examples presented herein are centered around a "pinch" gesture, but more generally any sort of suitable manipulation gesture may be used, e.g., pinch, point, grasp, wipe, push. Objects may be rotated, translated, resized, stretched, deleted, etc. Some objects may be stretch resized, e.g., the user can aim at one side and make the object wider/longer, like pulling a windowshade. Menus or other enhanced features may be called. For example, press/hold may open menu, keyboard, etc.

To manipulate a distal object, the same actions and gestures can be used, because the user's palm sets the ray, and the fingers are left available for manipulation. For example, at 630 of FIG. 6, a user is shown targeting virtual ball 605 with a first ray 635 emanating from left hand 610 and targeting virtual ball 605 with a second ray 640 emanating from left hand 620. The user may manipulate virtual ball 605 using the same manipulation gestures shown at 600, e.g., grasping virtual ball 605 with a left hand 610 and pinching a control point 615 of virtual ball with a right hand 620.

A virtual object may be rendered at a relative distance that is within a predefined threshold distance (e.g., less than the user's arm length), and the user may then directly target and select the virtual object using a natural interaction methodology. Once selected, the virtual object may be manipulated using a first set of manipulation gestures.

When the virtual object is rendered at a relative distance that is greater than the predefined threshold distance (e.g., greater than the user's arm length), the user may target and select the virtual object using ray-casting, as described herein. Once selected, the virtual object may be manipulated using the same first set of manipulation gestures for objects within the predefined threshold distance.

In some examples, a user may elect to target and select objects within the predefined threshold distance using ray-casting. Again, the same first set of manipulation gestures may be used to manipulate the selected virtual object.

For two hand manipulation, two or more modes may be available. For example, each hand may select a different affordance, thus enabling two hand scaling, rotation, manipulation, etc. This may provide the user more control. As shown at 630 of FIG. 6, an affordanceless mode may also be called, where the user aims two rays at an object surface and performs scaling, rotation, translation, etc. Movement of the user's hands may cause the manipulation. For example, if the user's hands stay the same distance apart the object rotates. If the user's hands spread, the object may be resized, etc. In some examples, affordanceless manipulations may be more natural but more rough, while affordance aiming can achieve more fine control.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
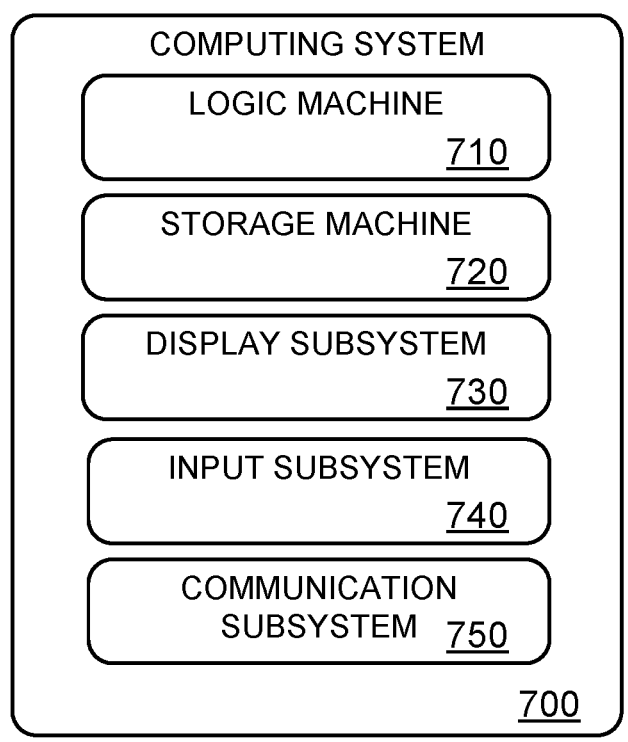
FIG. 7 shows a schematic view of an example computing environment in which the method of FIG. 3 may be enacted.

FIG. 7 schematically shows a non-limiting embodiment of a computing system 700 that can enact one or more of the methods and processes described above. Computing system 700 is shown in simplified form. Computing system 700 may embody the head-mounted display device 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a system for a head-mounted display, comprises a display device; an outward-facing depth camera; and a storage machine comprising instructions executable by a logic machine to: present one or more virtual objects on the display device; receive information from the depth camera about an environment; determine a position of the head-mounted display within the environment; infer a position of a joint of a user's arm based on the position of the head-mounted display; determine a position of the user's hand based on the information received from the depth camera; cast a ray from a portion of the user's hand based on the position of the joint of the user's arm and the position of the user's hand; and responsive to the ray intersecting with one or more control points of a virtual object, indicate to the user that the virtual object is being targeted. In such an example, or any other example, the storage machine may additionally or alternatively further comprise instructions executable by the logic machine to: recognize a selection gesture from the user's hand based on information received from the depth camera; and select the targeted virtual object responsive to recognizing the selection gesture. In any of the preceding examples, or any other example, the storage machine may additionally or alternatively further comprise instructions executable by the logic machine to: recognize a manipulation gesture from fingers of the user's hand based on information received from the depth camera; and manipulate the selected virtual object responsive to recognizing the manipulation gesture. In any of the preceding examples, or any other example, the manipulation gesture may additionally or alternatively be a two-hand manipulation gesture. In any of the preceding examples, or any other example, indicating to the user that the virtual object is being targeted may additionally or alternatively include presenting a targeting cursor at a terminus of the ray opposite the user's hand. In any of the preceding examples, or any other example, the storage machine may additionally or alternatively further comprise instructions executable by the logic machine to: adjust an appearance of the targeting cursor responsive to recognizing the selection gesture from the user's hand. In any of the preceding examples, or any other example, the joint of the user's arm may additionally or alternatively be a shoulder joint. In any of the preceding examples, or any other example, the joint of the user's arm may additionally or alternatively be an elbow joint. In any of the preceding examples, or any other example, the portion of the user's hand may additionally or alternatively be a palm. In any of the preceding examples, or any other example, the portion of the user's hand may additionally or alternatively be a knuckle. In any of the preceding examples, or any other example, the portion of the user's hand may additionally or alternatively be a wrist.

In another example, a method, comprises presenting one or more virtual objects on a head-mounted display; receiving information from a depth camera about an environment; determining a position of the head-mounted display within the environment; inferring a position of a joint of a user's arm based on the position of the head-mounted display; determining a position of the user's hand based on the information received from the depth camera; casting a ray from a portion of the user's hand based on the position of the joint of the user's arm and the position of the user's hand;

and responsive to the ray intersecting with one or more control points of a virtual object, indicating to the user that the virtual object is being targeted. In such an example, or any other examples, the method may additionally or alternatively comprise recognizing a selection gesture from the user's hand based on information received from the depth camera; and selecting the targeted virtual object responsive to recognizing the selection gesture. In any of the preceding examples, or any other example, the method may additionally or alternatively comprise recognizing a manipulation gesture from fingers of the user's hand based on information received from the depth camera; and manipulating the selected virtual object responsive to recognizing the manipulation gesture. In any of the preceding examples, or any other example, the manipulation gesture may additionally or alternatively be a two-hand manipulation gesture. In any of the preceding examples, or any other example, indicating to the user that the virtual object is being targeted may additionally or alternatively include presenting a targeting cursor at a terminus of the ray opposite the user's hand. In any of the preceding examples, or any other example, the method may additionally or alternatively comprise adjusting an appearance of the targeting cursor responsive to recognizing the selection gesture from the user's hand.

In yet another example, a system for a head-mounted display, comprises a display device; an outward-facing depth camera; and a storage machine comprising instructions executable by a logic machine to: receive information from the depth camera about an environment; determine a position of the head-mounted display within the environment; present one or more virtual objects on the display device within a threshold distance of the head-mounted display; select a first virtual object within the threshold distance of the head-mounted display responsive to recognizing a natural selection gesture by a user's hand based on information received from the depth camera; recognize a first manipulation gesture selected from a first set of manipulation gestures from fingers of the user's hand based on information received from the depth camera; manipulate the first virtual object responsive to recognizing the first manipulation gesture; present one or more virtual objects on the display device at a distance greater than the threshold distance from the head-mounted display; infer a position of a joint of a user's arm based on the position of the head-mounted display; determine a position of the user's hand based on the information received from the depth camera; cast a ray from a portion of the user's hand based on the position of the joint of the user's arm and the position of the user's hand; responsive to the ray intersecting with one or more control points of a second virtual object that is greater than the threshold distance from the head-mounted display, indicate to the user that the second virtual object is being targeted; recognize a selection gesture from the user's hand based on information received from the depth camera; select the second virtual object responsive to recognizing the selection gesture; recognize a second manipulation gesture selected from the first set of manipulation gestures from fingers of the user's hand based on information received from the depth camera; and manipulate the second virtual object responsive to recognizing the second manipulation gesture. In such an example, or any other example, the joint of the user's arm may additionally or alternatively be a shoulder joint and the portion of the user's hand may additionally or alternatively be a palm. In any of the preceding examples, or any other example, one or both of the first manipulation gesture and the second manipulation gesture may additionally or alternatively be a two-hand manipulation gesture.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for a head-mounted display, comprising:
a frame;
a display device;
an outward-facing depth camera positioned on the frame; and
a storage machine comprising instructions executable by a logic machine to:
receive information from the depth camera about an environment;
present one or more virtual objects on the display device so that the virtual objects appear to be positioned within the environment;
determine a position of the head-mounted display within the environment;
assign a position within the environment of a joint of a user's arm that is located outside of a field-of-view of the depth camera, the assigned position based at least on the determined position of the head-mounted display and a pre-determined spatial relationship between the joint of the user's arm and the head-mounted display;
determine a position of the user's hand based at least on pixels of a depth map corresponding to the user as determined from the information received from the depth camera;
cast a ray from a portion of the user's hand based on the position of the joint of the user's arm and the position of the user's hand; and
responsive to the ray intersecting with one or more control points of a virtual object, indicate to the user that the virtual object is being targeted.

2. The system of claim 1, wherein the storage machine further comprises instructions executable by the logic machine to:
recognize a selection gesture from the user's hand based on information received from the depth camera; and
select the targeted virtual object responsive to recognizing the selection gesture.

3. The system of claim 2, wherein the storage machine further comprises instructions executable by the logic machine to:
recognize a manipulation gesture from fingers of the user's hand based on information received from the depth camera; and
manipulate the selected virtual object responsive to recognizing the manipulation gesture.

4. The system of claim 3, wherein the manipulation gesture is a two-hand manipulation gesture.

5. The system of claim 2, wherein indicating to the user that the virtual object is being targeted includes presenting a targeting cursor at a terminus of the ray opposite the user's hand.

6. The system of claim 5, wherein the storage machine further comprises instructions executable by the logic machine to:
adjust an appearance of the targeting cursor responsive to recognizing the selection gesture from the user's hand.

7. The system of claim 1, wherein the joint of the user's arm is a shoulder joint.

8. The system of claim 1, wherein the joint of the user's arm is an elbow joint.

9. The system of claim 1, wherein the portion of the user's hand is a palm, and wherein the pre-determined spatial relationship between the joint of the user's arm and the head-mounted display is based on ergonomics-based metrics.

10. The system of claim 1, wherein the portion of the user's hand is a knuckle, and wherein the pre-determined spatial relationship between the joint of the user's arm and the head-mounted display is based on previously performed calibration exercises.

11. The system of claim 1, wherein the portion of the user's hand is a wrist, and wherein the position of the joint of the user's arm is based at least in part of the position of the user's wrist.

12. A method, comprising:
receiving information from a head-mounted depth camera about an environment;
presenting one or more virtual objects on a head-mounted display so that the virtual objects appear to be positioned within the environment;
determining a position of the head-mounted display within the environment;
assigning a position within the environment of a joint of a user's arm that is located outside of a field-of-view of the depth camera, the assigned position based at least on the determined position of the head-mounted display and a pre-determined spatial relationship between the joint of the user's arm and the head-mounted display;
determining a position of the user's hand based at least on pixels of a depth map corresponding to the user as determined from the information received from the depth camera;
casting a ray from a portion of the user's hand based on the position of the joint of the user's arm and the position of the user's hand; and
responsive to the ray intersecting with one or more control points of a virtual object, indicating to the user that the virtual object is being targeted.

13. The method of claim 12, further comprising:
recognizing a selection gesture from the user's hand based on information received from the depth camera; and
selecting the targeted virtual object responsive to recognizing the selection gesture.

14. The method of claim 13, further comprising:
recognizing a manipulation gesture from fingers of the user's hand based on information received from the depth camera; and
manipulating the selected virtual object responsive to recognizing the manipulation gesture.

15. The method of claim 14, wherein the manipulation gesture is a two-hand manipulation gesture.

16. The method of claim 13, wherein indicating to the user that the virtual object is being targeted includes presenting a targeting cursor at a terminus of the ray opposite the user's hand.

17. The method of claim 16, further comprising:
adjusting an appearance of the targeting cursor responsive to recognizing the selection gesture from the user's hand.

18. A system for a head-mounted display, comprising:
a frame;
a display device;
an outward-facing depth camera positioned on the frame; and
a storage machine comprising instructions executable by a logic machine to:
receive information from the depth camera about an environment;
determine a position of the head-mounted display within the environment;
present one or more virtual objects on the display device so that the one or more virtual objects appear to be positioned within a threshold distance of the head-mounted display;
select a first virtual object within the threshold distance of the head-mounted display responsive to recognizing a natural selection gesture by a user's hand based on information received from the depth camera;
recognize a first manipulation gesture selected from a first set of manipulation gestures from fingers of the user's hand based on information received from the depth camera;
manipulate the first virtual object responsive to recognizing the first manipulation gesture;
present one or more virtual objects on the display device so that the one or more virtual objects appear to be positioned at a distance greater than the threshold distance from the head-mounted display;
assign a position within the environment of a joint of a user's arm that is located outside of a field-of-view of the depth camera, the assigned position based at least on the determined position of the head-mounted display and a pre-determined spatial relationship between the joint of the user's arm and the head-mounted display;
determine a position of the user's hand based at least on pixels of a depth map corresponding to the user as determined from the information received from the depth camera;
cast a ray from a portion of the user's hand based on the position of the joint of the user's arm and the position of the user's hand;
responsive to the ray intersecting with one or more control points of a second virtual object that is greater than the threshold distance from the head-mounted display, indicate to the user that the second virtual object is being targeted;
recognize a selection gesture from the user's hand based on information received from the depth camera;
select the second virtual object responsive to recognizing the selection gesture;
recognize a second manipulation gesture selected from the first set of manipulation gestures from fingers of the user's hand based on information received from the depth camera; and
manipulate the second virtual object responsive to recognizing the second manipulation gesture.

19. The system of claim 18, wherein the joint of the user's arm is a shoulder joint and wherein the portion of the user's hand is a palm.

20. The system of claim 18, wherein one or both of the first manipulation gesture and the second manipulation gesture is a two-hand manipulation gesture.

* * * * *